United States Patent
Inagaki et al.

(10) Patent No.: US 7,534,189 B2
(45) Date of Patent: May 19, 2009

(54) PLANETARY GEAR TRAIN AND DRIVING UNIT HAVING THE SAME

(75) Inventors: Tomohiro Inagaki, Nishio (JP); Takuya Komatsu, Nishio (JP); Katsutoshi Shimizu, Nukata (JP); Satoru Wakuta, Nagoya (JP); Junji Matsushita, Anjo (JP); Kazutoshi Motoike, Okazaki (JP); Masatoshi Adachi, Nishikamo-gun (JP); Kinya Yoshii, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 408 days.

(21) Appl. No.: 11/600,228

(22) Filed: Nov. 16, 2006

(65) Prior Publication Data

US 2007/0111847 A1 May 17, 2007

(30) Foreign Application Priority Data

Nov. 17, 2005 (JP) ............................. 2005-333251

(51) Int. Cl.
*F16H 57/08* (2006.01)
(52) U.S. Cl. .................................................. 475/331
(58) Field of Classification Search .................. 475/331
See application file for complete search history.

(56) References Cited

U.S. PATENT DOCUMENTS

| | | | | |
|---|---|---|---|---|
| 6,561,945 | B2 * | 5/2003 | Shattuck et al. ............. | 475/331 |
| 6,702,711 | B2 * | 3/2004 | Zelikov et al. .............. | 475/331 |
| 7,025,704 | B2 * | 4/2006 | Yasuda et al. ............... | 475/323 |

FOREIGN PATENT DOCUMENTS

| | | |
|---|---|---|
| JP | U-57-35551 | 2/1982 |
| JP | A-2-203049 | 8/1990 |
| JP | 2002-161951 A | 6/2002 |
| JP | A-5-172193 | 7/2003 |
| JP | 2004-347107 A | 12/2004 |
| JP | 2004-353780 A | 12/2004 |
| JP | 2005308048 A * | 11/2005 |
| SU | 804963 | 2/1981 |

* cited by examiner

*Primary Examiner*—Ha D. Ho
(74) *Attorney, Agent, or Firm*—Oliff & Berridge, PLC

(57) ABSTRACT

A planetary gear train includes a carrier having a first side plate, a second side plate disposed in parallel to the first side plate and pinions rotatably supported by the first and second side plates; and a ring member secured to an outer edge of the second side plate. The first side plate has a plurality of first convex portions whose edge portion form an outer edge and a plurality of first concave portions formed between adjacent first convex portions. The second side plate has a plurality of second convex portions whose edge portion form an outer edge and whose width in a peripheral direction is wider than the first convex portion, and a plurality of carrier bridges axially extended from a part between the plurality of second convex portions to the plurality of first concave portions and secured to the first concave portion.

7 Claims, 4 Drawing Sheets

PLANETARY GEAR TRAIN AND DRIVING UNIT HAVING THE SAME

INCORPORATION BY REFERENCE

The disclosure of Japanese Patent Application No. 2005-333251 filed on Nov. 17, 2005 including the specification, drawings and abstract is incorporated herein by reference in its entirety.

BACKGROUND

The present invention relates to a planetary gear train.

A planetary gear train has a carrier with a plurality of pinions, a sun gear located at the center thereof and biting with the pinions and a ring member disposed so as to surround them and biting with the pinions in general. Among them, the carrier has two carrier plates and comprises a carrier case for supporting pinion shafts that rotatably support the pinions from both sides by extending and securing carrier bridges from one carrier plate to the other carrier plate.

Such a planetary gear train is used as a power distributing planetary gear train in Japanese Patent Laid-Open No. 2004-353780, for example. The carrier is formed in a body with an input shaft that is connected with an internal combustion engine, the sun gear is linked with a first motor for primarily generating electricity and the ring gear is linked with a driving shaft that is connected with an output shaft, respectively. Power is thus distributed from the internal combustion engine to the first motor and the driving shaft and part of the power of the internal combustion engine is transmitted to an oil pump disposed on a shaft parallel with the input shaft (below the power distributing planetary gear train) by the ring member secured to an outer edge of the carrier plate that is the root of the carrier bridge.

SUMMARY

By the way, it is necessary to weld two spots between the outer edge of one carrier plate and the ring member and between the other carrier plate and the carrier bridge when assembling such a carrier. Although it is preferable to weld the two spots from one side as much as possible in order to simplify manufacturing, welding is conducted from a direction aslant from an outer peripheral side to an inner peripheral side if one tries to weld the spot between the outer edge of one carrier plate and the ring member from the direction in which one has welded the spot between the other carrier plate and the carrier bridge because the shapes of the two carrier plates are almost identical.

However, if one tries to weld the ring member from the direction aslant toward the inner peripheral side as described above, there arises a problem in that there is a possibility that welding material might fly during welding and stick to the part where the carrier plate abuts against the pinions (or a washer disposed between them), thereby affecting rotation of the pinions.

Therefore, it was not possible to weld them from the direction aslant toward the inner peripheral side as described above and it was necessary to weld the above-mentioned two spots from the outside of the carrier, i.e., to weld from the other side by reversing the carrier after welding either one side. However, there arose a problem in that welding the two spots by reversing the carrier as described above hampers simplification of the manufacturing process because a manufacturing step of reversing the carrier is added. There also arose a problem in that two types of jigs for holding the input shaft and for holding the carrier are necessary, especially when the carrier is formed in a body with the input shaft as described above.

Accordingly, the invention thus provides, among other things, a planetary gear train, and a driving unit having the same, that permits welding of a first side plate and a carrier bridge as well as a second side plate and a ring member from one side in an axial direction.

According to a first exemplary aspect of the invention, a planetary gear train includes a carrier having a first side plate, a second side plate disposed in parallel to the first side plate and pinions rotatably supported by the first and second side plates; and a ring member secured to an outer edge of the second side plate. The first side plate has a plurality of first convex portions whose edge portion form an outer edge and a plurality of first concave portions formed between adjacent first convex portions. The second side plate has a plurality of second convex portions whose edge portion form an outer edge and whose width in a peripheral direction is wider than the first convex portion, and a plurality of carrier bridges axially extended from a part between the plurality of second convex portions to the plurality of first concave portions and secured to the first concave portion.

According to a second exemplary aspect of the invention, a method of forming a planetary gear train with a carrier having a first side plate, a second side plate disposed in parallel to the first side plate and pinions rotatably supported by the first and second side plates, and a ring member secured to an outer edge of the second side plate, wherein the first side plate has a plurality of first convex portions whose edge portion form an outer edge and a plurality of first concave portions formed between adjacent first convex portions; and the second side plate has a plurality of second convex portions whose edge portion form an outer edge and whose width in a peripheral direction is wider than the first convex portion and a plurality of carrier bridges axially extended from a part between the plurality of second convex portions to the plurality of first concave portions and secured to the first concave portion, includes welding the first concave portion with the carrier bridge and an end portion in the peripheral direction of the edge portion of the second convex portion with the ring member from an axial direction on a side opposite from the second side plate with respect to the first side plate.

BRIEF DESCRIPTION OF THE DRAWINGS

Additional objects and advantages of the invention will be apparent from the following detailed description of a preferred embodiment thereof, which are best understood with reference to the accompanying drawings, wherein.

DETAILED DESCRIPTION OF EMBODIMENTS

An embodiment of the invention will be explained with reference to FIGS. 1-4.

Figure 1:
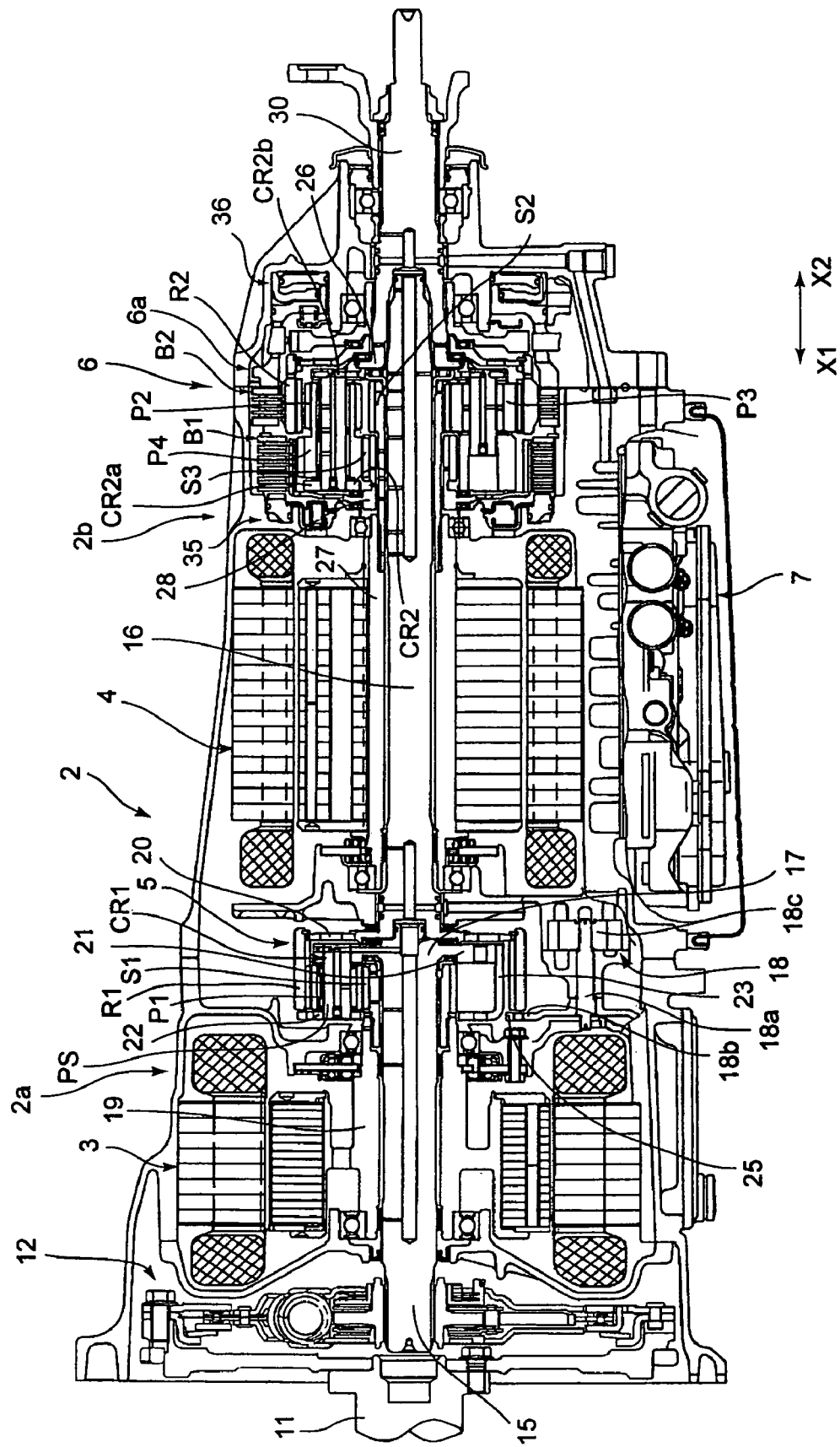
FIG. 1 is a section view showing a driving unit of the invention.

One example of a hybrid vehicle to which the invention is applicable will first be explained. As shown in FIG. 1, the hybrid vehicle is configured as a two-motor split type hybrid vehicle that has an internal combustion engine (not shown)

capable of outputting power, a driving unit 2 connected with the engine and driving wheels (rear wheels) (not shown) connected to the driving unit 2 via a differential unit (not shown).

The driving unit 2 has first and second driving devices 2a and 2b as units for outputting a driving force to the driving wheels. The first driving device 2a has a power distributing planetary gear (planetary gear train) 5 connected to the engine via a damper unit 12 and a first motor (MG1) 3 connected to the power distributing planetary gear 5 and to an output shaft 30 via the power distributing planetary gear 5 and a transmission shaft 16. The second driving device 2b has a second motor (MG2) 4 and a step transmission 6 interposed between the second motor 4 and the output shaft 30 and is connected to the output shaft 30.

Specifically, an input shaft (shaft member) 15 of the driving unit 2 is connected to a crank shaft 11 of the engine (not shown) via the damper unit 12 as shown in FIG. 1 and a carrier CR1 of the power distributing planetary gear 5 is connected to the input shaft 15 via a hub member 17. The carrier CR1 has pinions P1 rotatably supported by carrier plates 21 and 22. A rotor shaft 19 of the first motor 3 is connected to a sun gear S1 that gears with the pinions P1. The pinions P1 also gear with a ring gear R1. The ring gear R1 is connected with a hollow disc-like supporting member 20 and is connected with the transmission shaft 16 via the supporting member 20.

The step transmission 6 having a planetary gear unit 6a is connected to a rear end (direction X2) of the transmission shaft 16. Specifically, a carrier CR2 of the planetary gear unit 6a is connected with the output shaft 30 that is connected with the transmission shaft 16 via a hub member 26. The carrier CR2 has long pinions P2 and P4 and a short pinion P3 (referred to simply as a pinion P3 hereinafter) rotatably supported by side plates CR2a and CR2b. The pinion P2 of a small diameter portion is formed with the pinion P4 of a large diameter portion and the pinion P2 of the small diameter portion gears with the pinion P3.

The pinion P3 gears with a sun gear S2 and the sun gear S2 is connected with a rotor shaft 27 of the second motor 4. Still more, the pinion P4 gears with a sun gear S3 and the sun gear S3 is connected with a hub member 28. The hub member 28 engages, by means of a spline, with a friction plate of a first brake B1 that is a multi-plate brake so that the sun gear S3 is freely anchored by causing the first brake B1 to actuate hydraulic pressure to a hydraulic servo 35.

Still more, the pinion P3 gears with the ring gear R2 and the ring gear R2 engages, by means of a spline, with a friction plate of a second brake B2 that is a multi-plate brake so that the ring gear R2 is freely anchored by causing the second brake B2 to actuate hydraulic pressure to a hydraulic servo 36.

Then, the transmission shaft 16 is connected with the output shaft 30 of the driving unit 2. The output shaft 30 is linked to the differential unit via a coupling, a propeller shaft and others (not shown) is connected to the driving wheels (rear wheels) via right and left driving shafts from the differential unit.

Meanwhile, the driving unit 2 has a mechanical oil pump unit 18 that is driven by the engine and a hydraulic control unit 7 capable of supplying lubricant oil, cooling oil and hydraulic pressure of the two hydraulic servos to the step transmission 6 and the second motor 4 by receiving hydraulic pressure supplied from the mechanical oil pump unit 18.

The oil pump unit 18 is disposed under the power distributing planetary gear 5 described above and is driven with the input shaft 15. The oil pump unit 18 has a driving shaft 18a for driving the oil pump unit 18, an input gear 18b disposed above the driving shaft 18a and a main oil pump unit 18c. Then, the input gear 18b gears with the ring gear 25 described above and the oil pump unit 18 is allowed to drive in linkage with the input shaft 15.

Next, transmission of power of the hybrid vehicle described above will be explained with reference to FIG. 1. When engine torque is outputted as a driving force from the engine (not shown), it is inputted to the carrier CR1 of the power distributing planetary gear 5 via the crank shaft 11, the damper unit 12, the input shaft 15 and the hub member 17 as shown in FIG. 1. Meanwhile, when the torque of the first motor 3 (also referred to as the first motor torque hereinafter) is controlled so that the first motor 3 regenerates (produces electric power), part of the engine torque is distributed to the first motor 3 and the first motor torque is transmitted as reaction force to the sun gear S1 via the rotor shaft 19. Then, receiving the reaction force of the sun gear S1, the ring gear R1 rotates and the remaining part of the engine torque is distributed, i.e., the driving force outputted out of the first driving device 2a is outputted, to the transmission shaft 16.

Meanwhile, when hydraulic pressure is supplied to the hydraulic servo 35 of the first brake B1 and to the hydraulic servo 36 of the second brake B2 by the hydraulic control unit 7, the first and second brakes B1 and B2 are anchored and the step transmission 6 is shifted. That is, in a state when the first brake B1 is engaged and the second brake B2 is disengaged, rotation of the sun gear S3 is fixed by the first brake B1. Then, the step transmission 6 is put into a high-speed stage (Hi) in which the carrier CR2 rotates at a high speed by the sun gear S3 whose rotation is fixed and the sun gear S2 rotates via the second motor 4.

Still more, in a state when the second brake B2 is engaged and the first brake B1 is disengaged, rotation of the ring gear R2 is fixed by the second brake B2. Then, the step transmission 6 is put into a low-speed stage (Lo) in which the carrier CR2 rotates at a low speed by the ring gear R2 whose rotation is fixed and rotation of the sun gear S2 rotates via the second motor 4.

It is noted that in a state when the first and second brakes B1 and B2 are both disengaged, the sun gear S3 and the ring gear R2 are both put into an idling state and the step transmission 6 is put into a neutral state in which the rotation of the sun gear S2, i.e., rotations of the second motor 4 and of the carrier CR2, are not transmitted from each other.

Further, when the second motor 4 outputs torque (referred to also as second motor torque hereinafter), the second motor torque is transmitted to the sun gear S2 via the rotor shaft 27. It is outputted to the carrier CR2 as a relatively large torque if the step transmission 6 has been shifted to the low-speed stage (Lo) at this time and as a relatively small torque if the step transmission 6 has been shifted to the high-speed stage (Hi). That is, the driving force outputted out of the second driving device 2b is outputted to the output shaft 30.

Then, the total output torque (driving force outputted to the driving wheels) in which the torque from the first driving device 2a and that from the second driving device 2b are totaled and outputted from the output shaft 30 of the driving unit 2 to the differential unit via the coupling, the propeller shaft and others (not shown) and is outputted further to the driving wheels (rear wheels) from the differential unit via the right and left driving wheels.

Next, the power distributing planetary gear 5 will be explained in detail.

The power distributing planetary gear 5 described above has roughly the carrier CR1 connected with the input shaft 15, the sun gear S1 connected with the first motor 3 and the ring gear R1 connected with the transmission shaft 16.

The sun gear S1 is an external gear formed in the shape of a hollow shaft and is rotatably supported by the input shaft 15 that penetrates through the hollow part. The sun gear S1 gears with the pinions P1 and is engaged with the rotor shaft 19 of the first motor 3.

The pinions P1 also gear with the ring gear R1. The ring gear R1 is an internal gear formed in the shape of a hollow shaft, is connected with a drum-like supporting member 20 and is connected to the transmission shaft 16 via the supporting member 20.

Figure 2:
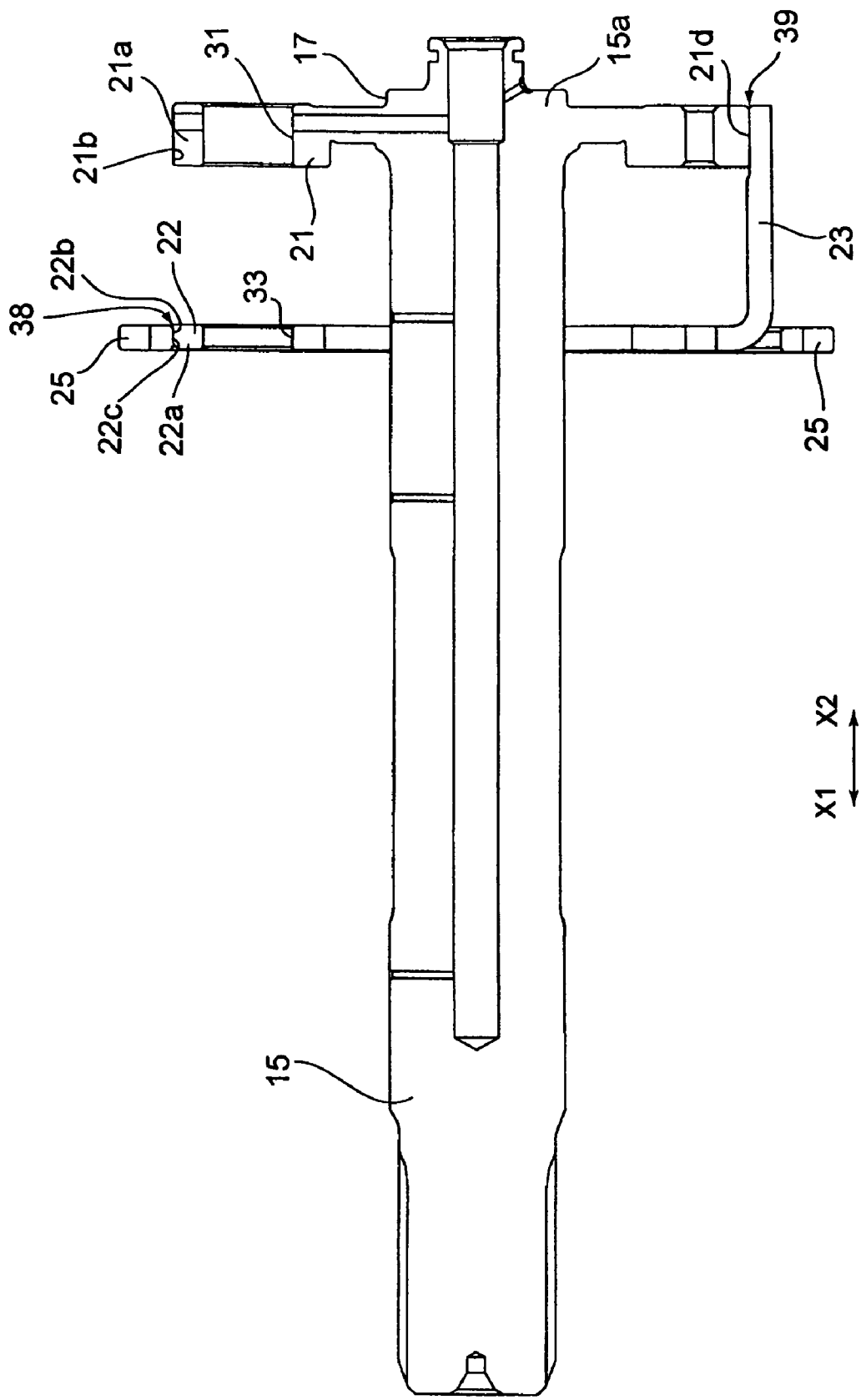
FIG. 2 is a section view showing an input shaft, a ring member and carrier plates.
Figure 3:
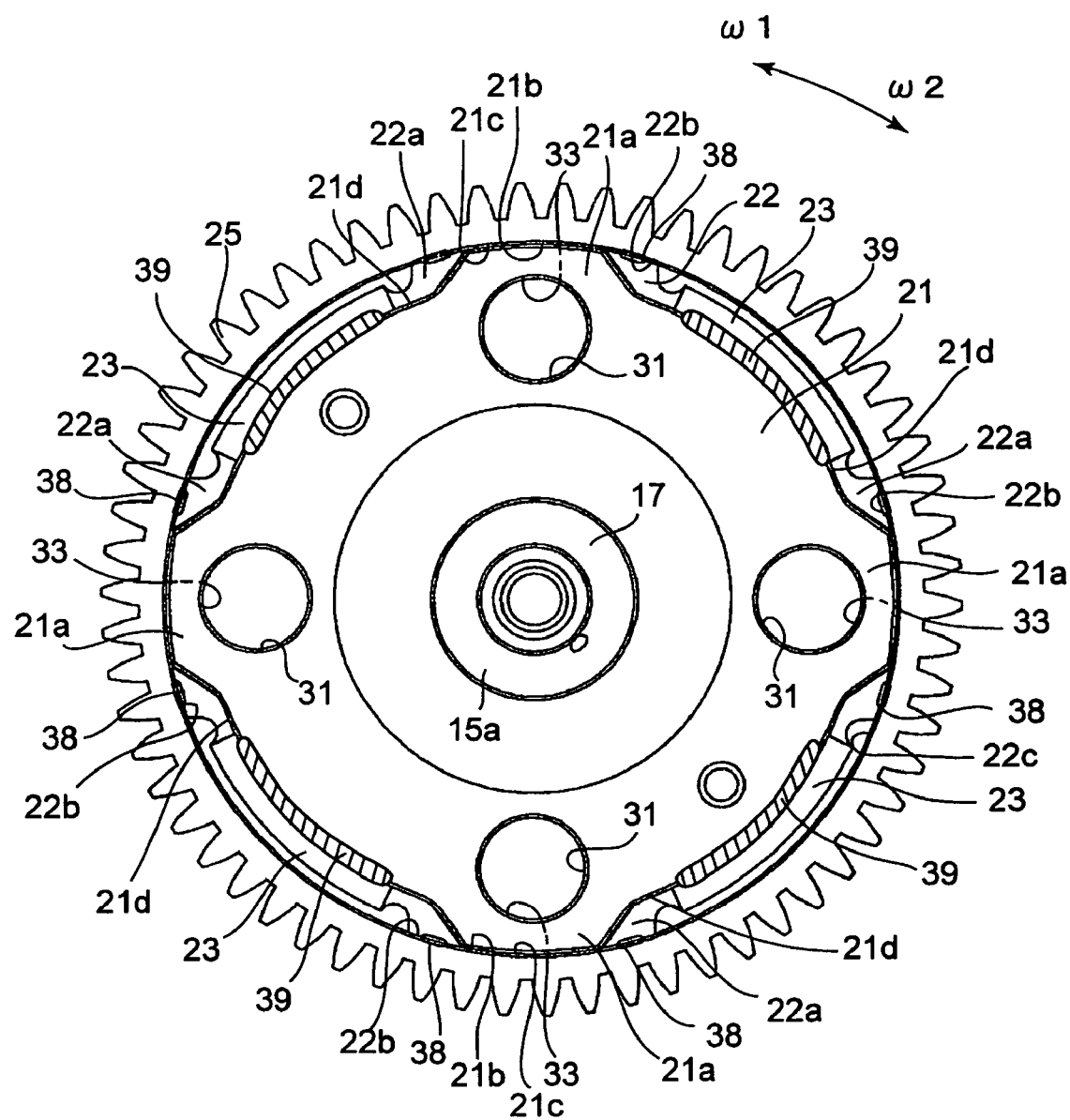
FIG. 3 is a plan view seen from a direction X1 in FIG. 2.

As shown in FIGS. 2 and 3, the carrier CR1 has a rear carrier plate (first side plate) 21 formed with the input shaft 15 together with the hub member 17 and a front carrier plate (second side plate) 22 formed with a carrier bridge 23. The carrier CR1 also has a plurality of pinions P1 rotatably supported by both of the carrier plates 21 and 22, which are substantially parallel to each other. A ring gear (ring member) 25 for driving the oil pump unit 18 (described later) is secured to an outer edge 22c of the front carrier plate 22.

The rear carrier plate 21 provided in the carrier CR1 described above is formed in the shape of a disk with an outer peripheral end portion 15a of the input shaft 15 in the direction X2. The rear carrier plate 21 has holes 31 that support pinion shafts PS for rotatably supporting four pinions P1, for example, and first convex portions 21a whose edge portions 21b form outer edges 21c of the rear carrier plate 21 near positions corresponding to the holes 31 in a radially outer peripheral direction. It also has first concave portions 21d formed between adjacent first convex portions 21a.

The front carrier plate 22 is formed in the shape of a hollow disk in parallel with the rear carrier plate 21 in a direction X1 with respect to the rear carrier plate 21. The input shaft 15 penetrates through the hollow portion. The front carrier plate 22 also has holes 33 for rotatably supporting the four pinions in the same manner with the rear carrier plate 21 and second convex portions 22a having outer edges 22c formed near positions corresponding to the holes 33 in a radially outer peripheral direction. The four carrier bridges 23, for example, are formed in a body with the front carrier plate 22 and axially extending toward the rear carrier plate 21 and are provided between the respective second convex portions 22a. The carrier bridge 23 is secured to the rear carrier plate 21 at a connecting section 39 of the first concave portion 21d described above by welding, respectively.

The ring gear 25 described above is an external tooth gear formed in the shape of a ring and is secured to an end portion 22e of the outer edge 22c of the second convex portion 22a of the front carrier plate 22 by means of welding. The ring gear 25 gears with the input gear 18b of the oil pump unit 18 as described above so as to be able to transmit the driving force to the oil pump unit 18.

As shown in FIG. 3, the second convex portion 22a is formed so that its width is wider than the first convex portion 21a in a peripheral direction (direction ω1-ω2). That is, they are arranged so that parts 38 for connecting the ring gear 25 with the end portion 22e of the outer edge 22c of the front carrier plate 22 may be exposed when seen from the direction X1 and the welding of the second convex portion 22a with the ring gear 25 may be carried out at the connecting part 38 from the side of the direction X1 in the axial direction.

Figure 4:
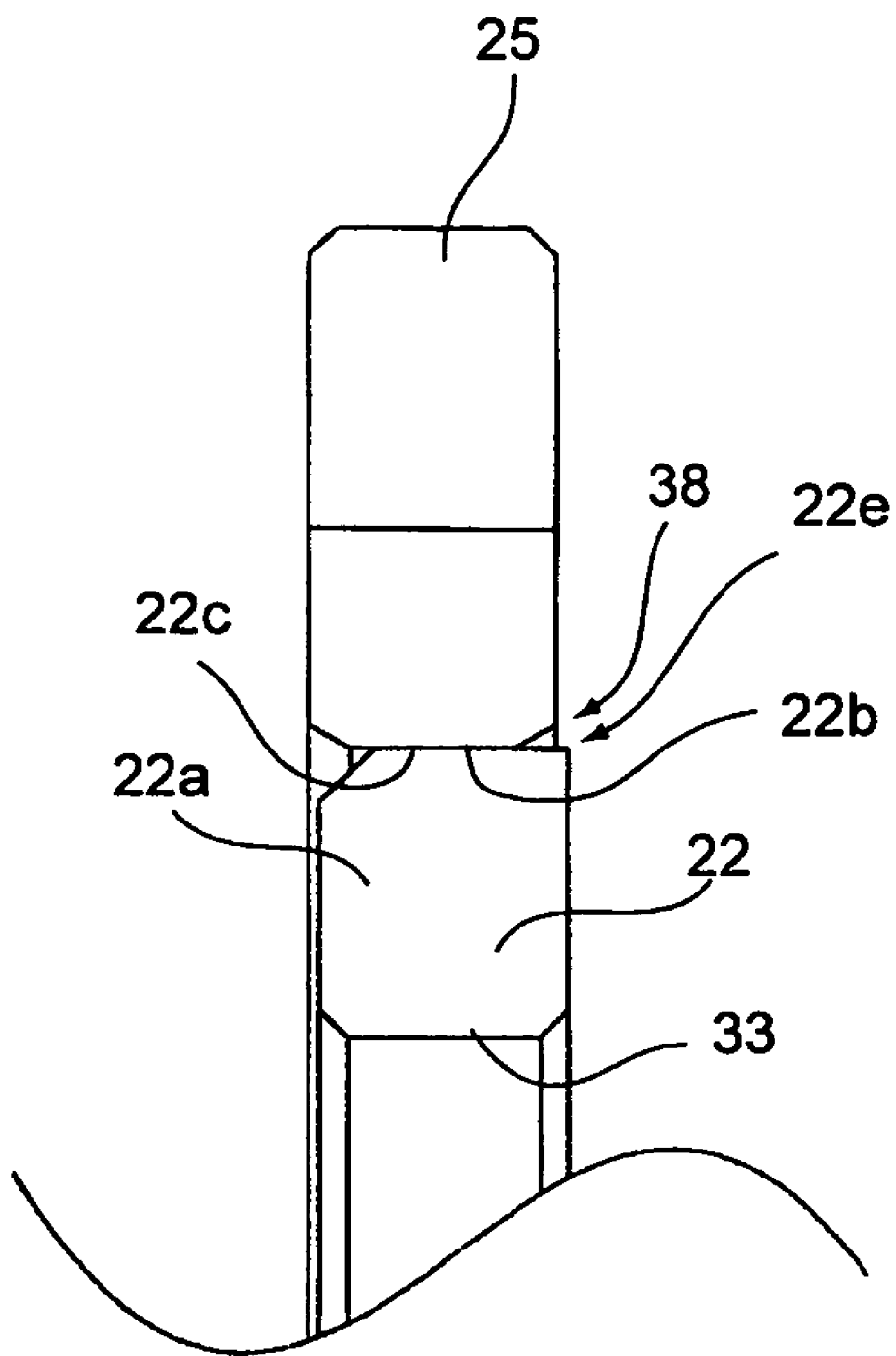
FIG. 4 is an enlarged section view of a second side plate and a ring member securing section.

Further, as shown in FIG. 4, the ring gear 25 is also arranged so that its side face on the side of the rear carrier plate 21 (in the direction X2) is offset axially in the direction (direction X1) opposite from the rear carrier plate 21 with respect to a side face (in the direction X2) of the front carrier plate 22. Accordingly, welding material readily flows in the outer peripheral direction when welding with the outer edge 22c of the front carrier plate 22 to prevent the welding material and others from sticking on the face (in the direction X2) of the front carrier plate 22 where it abuts against the washer.

In assembling a carrier case of the power distributing planetary gear 5 of the invention, the front carrier plate 22, from which the carrier bridges 23 extend, is disposed in position and the input shaft 15 is fixed by means of a jig in the direction X1. Then, the carrier bridges 23 are welded with the rear carrier plate 21 at the connecting parts 39 axially from the side of the direction X1 by means of laser welding for example. Next, the outer edges 22c of the front carrier plate 22 are welded with the ring gear 25 in the offset state as described above.

As described above, the power distributing planetary gear 5 of the invention is arranged such that the second convex portion 22a of the front carrier plate 22 is formed so that its width in the peripheral direction (direction ω1-ω2) is wider than the width in the peripheral direction of the first convex portion 21a of the rear carrier plate 21 so as to be able to weld the first concave portion 21d of the rear carrier plate 21 with the carrier bridge 23 as well as an end portion 22e in the peripheral direction of the edge portion 22b of the second convex portion 22a of the front carrier plate 22 with the ring gear 25 from one side (in the direction X1) in the axial direction opposite from the front carrier plate 22 with respect to the rear carrier plate 21. The step of reversing the carrier CR1 may thus be eliminated and the manufacturing step may be simplified while preventing the welding material from sticking to the part where the front carrier plate 22 abuts against the pinions P1 (or the washer) during the welding. Still more, because it becomes unnecessary to replace the jig by eliminating the step of revering the carrier CR1, it becomes possible to reduce the type of jigs and to cut the costs.

Still more, because the ring gear 25 is welded to the outer edge 22c of the front carrier plate 22 by offsetting its rear side face to the side axially opposite from the rear carrier plate 21 (in the direction X1) with respect to the side face of the front carrier plate 22, the welding material may flow in the outer peripheral direction during welding. Thereby, it becomes even more possible to prevent the welding material from sticking to the part where the front carrier plate 22 abuts against the pinions P1 (or the washer) during the welding.

Still more, because the rear carrier plate 21 is formed in a body with the outer peripheral portion 15a of the input shaft 15, two types of jigs for supporting the rear carrier plate 21 and for supporting the input shaft 15 are otherwise required in welding them from both sides for example. However, because the invention permits welding them from one side in the axial direction, it is possible to reduce the types of jigs.

It is noted that although the planetary gear train of the single pinion type has been explained in the embodiment described above, a planetary gear train of a double pinion-type or of Ravigneaux-type may be used. Any type of planetary gear train may be used as long as it has a carrier to which the invention is applicable.

Still more, although the ring gear of the embodiment has been explained as one for driving the oil pump unit, it may be a parking gear for example. It may be a ring gear of any use as long as it is formed to be a ring secured to the outer edge of the carrier plate.

Furthermore, although the shaft member has been explained as the input shaft, the type of shaft is not limited to that and any type of shaft such as an intermediate shaft and an output shaft may be used as long as it is a shaft member from which the carrier plate of the planetary gear train is formed and connected.

Although using the laser welding has been explained in the present embodiment, it is needless to say that other welding methods may be used.

Still more, although the front and rear carrier plates whose outer diameters are almost equal have been explained, the outer diameter of the front and rear carrier plates needs not be almost same as long as it is possible to weld them from axially parallel one direction.

Further, although the case when the front carrier plate has been secured to the ring member in the offset state has been explained, it is needless to say that the invention is applicable to one secured in a non-offset state.

While the preferred embodiments have been described, variations thereto will occur to those skilled in the art within the scope of the present inventive concepts which are delineated by the following claims.

According to various exemplary aspects, the invention permits the step of reversing the carrier to be eliminated and the manufacturing process to be simplified while preventing the welding material from sticking where the second side plate abuts against the pinions (or a washer) during welding.

According to various exemplary aspects, the invention allows the welding material to flow to the outer peripheral side during welding. Thereby, it becomes possible to prevent the welding material from hardly sticking to the part where the second side plate abuts against the pinions (or washer) during welding.

According to various exemplary aspects, although two types of jigs are normally necessary as jigs for supporting the first side plate and for supporting the shaft member in welding them from both sides for example, the invention allows them to be welded from one side of the axial direction and the number of types of jigs may be reduced.

According to various exemplary aspects, it is possible to weld the ring gear for driving the oil pump from one direction in the axial direction together with the carrier bridge.

What is claimed is:

1. A planetary gear train, comprising:
   a carrier having a first side plate, a second side plate disposed in parallel to the first side plate and pinions rotatably supported by the first and second side plates; and
   a ring member secured to an outer edge of the second side plate, wherein:
   the first side plate has a plurality of first convex portions whose edge portion form an outer edge and a plurality of first concave portions formed between adjacent first convex portions; and
   the second side plate has:
      a plurality of second convex portions whose edge portion form an outer edge and whose width in a peripheral direction is wider than the first convex portion, and
      a plurality of carrier bridges axially extended from a part between the plurality of second convex portions to the plurality of first concave portions and secured to the first concave portion.

2. The planetary gear train as set forth in claim 1, wherein the ring member is welded to the outer edge of the second side plate such that a side face of the second side plate on a side of the first side plate is offset with respect to the side face of the second side plate to a side axially opposite from the first side plate.

3. The planetary gear train as set forth in claim 2, wherein:
   the second side plate is formed in a shape of a hollow disk; and
   the first side plate is formed with an outer peripheral end portion of a shaft member that passes through a hollow part of the second side plate.

4. A driving unit, comprising:
   the planetary gear train as recited in claim 3;
   an input shaft capable of inputting rotation of a driving source; and
   an oil pump unit having a driving shaft and an input gear linked to and disposed on the driving shaft; wherein:
   the shaft member is the input shaft; and
   the ring member is a ring gear that gears with the input gear.

5. The planetary gear train as set forth in claim 1, wherein:
   the second side plate is formed in a shape of a hollow disk; and
   the first side plate is formed with an outer peripheral end portion of a shaft member that passes through a hollow part of the second side plate.

6. A driving unit, comprising:
   the planetary gear train as recited in claim 5;
   an input shaft capable of inputting rotation of a driving source; and
   an oil pump unit having a driving shaft and an input gear linked to and disposed on the driving shaft; wherein:
   the shaft member is the input shaft; and
   the ring member is a ring gear that gears with the input gear.

7. A method of forming a planetary gear train with a carrier having a first side plate, a second side plate disposed in parallel to the first side plate and pinions rotatably supported by the first and second side plates, and a ring member secured to an outer edge of the second side plate, wherein the first side plate has a plurality of first convex portions whose edge portion form an outer edge and a plurality of first concave portions formed between adjacent first convex portions; and the second side plate has a plurality of second convex portions whose edge portion form an outer edge and whose width in a peripheral direction is wider than the first convex portion and a plurality of carrier bridges axially extended from a part between the plurality of second convex portions to the plurality of first concave portions and secured to the first concave portion, comprising:
   welding the first concave portion with the carrier bridge and an end portion in the peripheral direction of the edge portion of the second convex portion with the ring member from an axial direction on a side opposite from the second side plate with respect to the first side plate.

* * * * *